United States Patent
Miura et al.

(10) Patent No.: US 10,778,338 B2
(45) Date of Patent: Sep. 15, 2020

(54) OPTICAL TRANSMITTER, OPTICAL RECEIVER, AND OPTICAL COMMUNICATION SYSTEM

(71) Applicant: MITSUBISHI ELECTRIC CORPORATION, Tokyo (JP)

(72) Inventors: Hiroshi Miura, Tokyo (JP); Tsuyoshi Yoshida, Tokyo (JP); Keisuke Matsuda, Tokyo (JP); Keisuke Dohi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/485,663

(22) PCT Filed: Apr. 19, 2017

(86) PCT No.: PCT/JP2017/015773
§ 371 (c)(1),
(2) Date: Aug. 13, 2019

(87) PCT Pub. No.: WO2018/193562
PCT Pub. Date: Oct. 25, 2018

(65) Prior Publication Data
US 2020/0007241 A1 Jan. 2, 2020

(51) Int. Cl.
*H04B 10/532* (2013.01)
*H04J 14/06* (2006.01)

(52) U.S. Cl.
CPC ............ *H04B 10/532* (2013.01); *H04J 14/06* (2013.01)

(58) Field of Classification Search
None
See application file for complete search history.

(56) References Cited

U.S. PATENT DOCUMENTS

| 9,143,238 B2 * | 9/2015 | Roberts ................ H04B 10/532 |
| 2008/0205905 A1 * | 8/2008 | Tao ....................... H04B 10/613 |
| | | 398/204 |

(Continued)

OTHER PUBLICATIONS

Kikuchi, "Digital coherent optical communication systems: fundamentals and future prospects", IEICE Electronics Express, Oct. 2011, vol. 8, No. 20, pp. 1642-1662.

(Continued)

*Primary Examiner* — David W Lambert
(74) *Attorney, Agent, or Firm* — Birch, Stewart, Kolasch & Birch, LLP

(57) ABSTRACT

An optical transmitter includes: a bit converter that processes input bits in units of four bits, and generates an output bit sequence having eight bits based on one of a first conversion table, a second conversion table, and a third conversion table; and a symbol mapper that allocates the output bit sequence to an X-polarization and to a Y-polarization of each of two consecutive time slots. The bit converter performs a process of generating the output bit sequence based on the first conversion table, the second conversion table, and the third conversion table. The bit converter performs the process such that a sequence of two most significant bits and a sequence of two least significant bits of the output bit sequence are respectively associated with values that are allocated respectively to two constellation points having phases different by 180 degrees on a complex plane.

10 Claims, 11 Drawing Sheets

(56) References Cited

U.S. PATENT DOCUMENTS

| | | | | |
|---|---|---|---|---|
| 2012/0087676 A1* | 4/2012 | Lim | .................... | H04B 10/116 |
| | | | | 398/182 |
| 2012/0224852 A1* | 9/2012 | Liu | .................... | H04B 10/2507 |
| | | | | 398/65 |
| 2014/0099116 A1* | 4/2014 | Bai | .................... | H04B 10/532 |
| | | | | 398/76 |
| 2016/0204871 A1* | 7/2016 | Li | .................... | H04B 10/5161 |
| | | | | 398/183 |
| 2016/0323040 A1* | 11/2016 | Wood | .................. | H04B 10/614 |
| 2017/0373704 A1* | 12/2017 | Nakamura | ............... | H04J 11/00 |

OTHER PUBLICATIONS

Kojima et al., "Constant Modulus 4D Optimized Constellation Alternative for DP-8QAM", Proc. ECOC, 2014, P.3.25, total 5 pages.

Millar et al., "High-dimensional modulation for coherent optical communications systems", Optics Express, Apr. 7, 2014, vol. 22, No. 7, pp. 8798-8812.

Recommendation ITU-T G.709/Y.1331, ITU-T, 2016, total 244 pages.

\* cited by examiner

FIG.4

Set A

| INPUT BITS | | | | D | D | D | D | P | P | P | P |
|---|---|---|---|---|---|---|---|---|---|---|---|
| b[0] | b[1] | b[2] | b[3] | B[0] | B[1] | B[2] | B[3] | B[4] | B[5] | B[6] | B[7] |
| 0 | 0 | 0 | 0 | 0 | 0 | 0 | 0 | 0 | 1 | 1 | 1 |
| 0 | 0 | 0 | 1 | 0 | 0 | 0 | 1 | 1 | 1 | 0 | 0 |
| 0 | 0 | 1 | 0 | 0 | 0 | 1 | 0 | 0 | 0 | 0 | 0 |
| 0 | 0 | 1 | 1 | 0 | 0 | 1 | 1 | 1 | 0 | 1 | 1 |
| 0 | 1 | 0 | 0 | 0 | 1 | 0 | 0 | 1 | 0 | 0 | 1 |
| 0 | 1 | 0 | 1 | 0 | 1 | 0 | 1 | 0 | 0 | 1 | 0 |
| 0 | 1 | 1 | 0 | 0 | 1 | 1 | 0 | 1 | 1 | 1 | 0 |
| 0 | 1 | 1 | 1 | 0 | 1 | 1 | 1 | 0 | 1 | 0 | 1 |
| 1 | 0 | 0 | 0 | 1 | 0 | 0 | 0 | 1 | 0 | 1 | 0 |
| 1 | 0 | 0 | 1 | 1 | 0 | 0 | 1 | 0 | 0 | 0 | 1 |
| 1 | 0 | 1 | 0 | 1 | 0 | 1 | 0 | 1 | 1 | 0 | 1 |
| 1 | 0 | 1 | 1 | 1 | 0 | 1 | 1 | 0 | 1 | 1 | 0 |
| 1 | 1 | 0 | 0 | 1 | 1 | 0 | 0 | 0 | 1 | 0 | 0 |
| 1 | 1 | 0 | 1 | 1 | 1 | 0 | 1 | 1 | 1 | 1 | 1 |
| 1 | 1 | 1 | 0 | 1 | 1 | 1 | 0 | 0 | 0 | 1 | 1 |
| 1 | 1 | 1 | 1 | 1 | 1 | 1 | 1 | 1 | 0 | 0 | 0 |

FIG.5

| INPUT BITS | | | | Set B | | | | | | | |
|---|---|---|---|---|---|---|---|---|---|---|---|
| | | | | D | P | D | P | P | D | P | D |
| b[0] | b[1] | b[2] | b[3] | B[0] | B[1] | B[2] | B[3] | B[4] | B[5] | B[6] | B[7] |
| 0 | 0 | 0 | 0 | 0 | 0 | 0 | 1 | 0 | 0 | 1 | 0 |
| 0 | 0 | 0 | 1 | 0 | 0 | 0 | 0 | 1 | 0 | 0 | 1 |
| 0 | 0 | 1 | 0 | 0 | 0 | 0 | 0 | 0 | 1 | 1 | 0 |
| 0 | 0 | 1 | 1 | 0 | 0 | 0 | 1 | 1 | 1 | 0 | 1 |
| 0 | 1 | 0 | 0 | 0 | 0 | 1 | 1 | 1 | 0 | 1 | 0 |
| 0 | 1 | 0 | 1 | 0 | 0 | 1 | 0 | 0 | 0 | 0 | 1 |
| 0 | 1 | 1 | 0 | 0 | 0 | 1 | 0 | 1 | 1 | 1 | 0 |
| 0 | 1 | 1 | 1 | 0 | 0 | 1 | 1 | 0 | 1 | 0 | 1 |
| 1 | 0 | 0 | 0 | 1 | 1 | 0 | 0 | 1 | 0 | 1 | 0 |
| 1 | 0 | 0 | 1 | 1 | 1 | 0 | 1 | 0 | 0 | 0 | 1 |
| 1 | 0 | 1 | 0 | 1 | 1 | 0 | 1 | 1 | 1 | 1 | 0 |
| 1 | 0 | 1 | 1 | 1 | 1 | 0 | 0 | 0 | 1 | 0 | 1 |
| 1 | 1 | 0 | 0 | 1 | 1 | 1 | 0 | 0 | 0 | 1 | 0 |
| 1 | 1 | 0 | 1 | 1 | 1 | 1 | 1 | 1 | 0 | 0 | 1 |
| 1 | 1 | 1 | 0 | 1 | 1 | 1 | 1 | 0 | 1 | 1 | 0 |
| 1 | 1 | 1 | 1 | 1 | 1 | 1 | 0 | 1 | 1 | 0 | 1 |

Set C

| INPUT BITS | | | | D | P | D | P | P | D | P | D |
|---|---|---|---|---|---|---|---|---|---|---|---|
| b[0] | b[1] | b[2] | b[3] | B[0] | B[1] | B[2] | B[3] | B[4] | B[5] | B[6] | B[7] |
| 0 | 0 | 0 | 0 | 0 | 1 | 0 | 0 | 1 | 0 | 0 | 0 |
| 0 | 0 | 0 | 1 | 0 | 1 | 0 | 1 | 0 | 0 | 1 | 1 |
| 0 | 0 | 1 | 0 | 0 | 1 | 0 | 1 | 1 | 1 | 0 | 0 |
| 0 | 0 | 1 | 1 | 0 | 1 | 0 | 0 | 0 | 1 | 1 | 1 |
| 0 | 1 | 0 | 0 | 0 | 1 | 1 | 0 | 0 | 0 | 0 | 0 |
| 0 | 1 | 0 | 1 | 0 | 1 | 1 | 1 | 1 | 0 | 1 | 1 |
| 0 | 1 | 1 | 0 | 0 | 1 | 1 | 1 | 0 | 1 | 0 | 0 |
| 0 | 1 | 1 | 1 | 0 | 1 | 1 | 0 | 1 | 1 | 1 | 1 |
| 1 | 0 | 0 | 0 | 1 | 0 | 0 | 1 | 0 | 0 | 0 | 0 |
| 1 | 0 | 0 | 1 | 1 | 0 | 0 | 0 | 1 | 0 | 1 | 1 |
| 1 | 0 | 1 | 0 | 1 | 0 | 0 | 0 | 0 | 1 | 0 | 0 |
| 1 | 0 | 1 | 1 | 1 | 0 | 0 | 1 | 1 | 1 | 1 | 1 |
| 1 | 1 | 0 | 0 | 1 | 0 | 1 | 1 | 1 | 0 | 0 | 0 |
| 1 | 1 | 0 | 1 | 1 | 0 | 1 | 0 | 0 | 0 | 1 | 1 |
| 1 | 1 | 1 | 0 | 1 | 0 | 1 | 0 | 1 | 1 | 0 | 0 |
| 1 | 1 | 1 | 1 | 1 | 0 | 1 | 1 | 0 | 1 | 1 | 1 |

OPTICAL TRANSMITTER, OPTICAL RECEIVER, AND OPTICAL COMMUNICATION SYSTEM

FIELD

The present invention relates to an optical transmitter, an optical receiver, and an optical communication system each for performing digital coherent optical communication.

BACKGROUND

Aiming at an improved efficiency of communication capacity allocation, digital coherent optical communication generally uses a polarization multiplexing method, which uses a polarization state including mutually orthogonal light waves. A polarization multiplexing method can achieve doubling of frequency usage efficiency, i.e., doubling of multilevel modulation, as compared to a method using single polarization. Examples of modulation method that uses this polarization multiplexing method include modulation methods such as dual polarization-quadrature phase shift keying (DP-QPSK), which represents modulation bits using phase information in each polarization to achieve a multilevel modulation of 4 bits per symbol, and dual polarization-16 quadrature amplitude modulation (DP-16QAM), which represents modulation bits using amplitude information in addition to phase information of each polarization to achieve a multilevel modulation of 8 bits per symbol (e.g., Non-Patent Literature 1).

The mutually exclusive nature between increasing of the multilevel modulation and increasing of transmittable distance requires the multilevel modulation to be changeable at a fine granularity depending on the required transmission distance to efficiently allocate a communication capacity. As one modulation method that allows the multilevel modulation to be selected at a fine granularity, multi-dimensional modulation methods have been proposed. A conventional polarization-multiplexed signal is mapped four dimensionally, that is, transmission data is mapped to constellation points independently in a two-dimensional phase space for each of polarizations existing in two directions. In contrast, in a multi-dimensional modulation, a transmission symbol is mapped in a dimension higher than four formed by multiple time slots (TSs) in addition to two polarizations and to the phase space. Multi-dimensional modulation allows the multilevel modulation to be altered at a fine granularity, and can improve noise tolerance owing to a greater Euclidean distance between symbol points (e.g., Non-Patent Literature 2). In addition, a method is also proposed that provides a multilevel modulation of 2 bits per symbol, equivalent to that of dual polarization-binary phase shift keying (DP-BPSK), in eight-dimensional mapping using a pair of neighboring time slots and a QPSK symbol constellation (e.g., Patent Literature 1)

CITATION LIST

Patent Literature

Patent Literature 1: U.S. Pat. No. 9,143,238

Non-Patent Literature

Non-Patent Literature 1: Kazuro Kikuchi, "Digital coherent optical communication systems: fundamentals and future prospects", IEICE Electronics Express, October 2011.

Non-Patent Literature 2: D. S. Millar, et al., "High-dimensional modulation for coherent optical communications systems", Optics Express, vol. 22, no. 7, 2014.

Non-Patent Literature 3: K. Kojima, et al., "Constant Modulus 4D Optimized Constellation Alternative for DP-8QAM", Proc. ECOC, P. 3.25, 2014.

SUMMARY

Technical Problem

An eight-dimensional modulation method using a conventional QPSK symbol constellation suffers from a problem in having a lower phase noise tolerance than a modulation method using a BPSK symbol constellation that provides a comparable frequency usage efficiency.

The present invention has been made in view of the foregoing, and it is an object of the present invention to provide an optical transmitter capable of improving phase noise tolerance in 8D multi-dimensional modulation using a QPSK symbol constellation.

Solution to Problem

To solve the problem and achieve the object described above, an optical transmitter according to the present invention includes: a bit converter that processes input bits in units of four bits, and generates an output bit sequence having eight bits based on one of a first conversion table, a second conversion table, and a third conversion table; and a symbol mapper that allocates the output bit sequence to an X-polarization and to a Y-polarization of each of two consecutive time slots. The bit converter: performs, at a first ratio, a process of generating the output bit sequence based on the first conversion table; and performs, each at a second ratio lower than the first ratio, a process of generating the output bit sequence based on the second conversion table and a process of generating the output bit sequence based on the third conversion table. The bit converter performs the process of generating the output bit sequence based on the second conversion table and the process of generating the output bit sequence based on the third conversion table such that a sequence of two most significant bits and a sequence of two least significant bits of the output bit sequence are respectively associated with values that are allocated respectively to two constellation points having phases different by 180 degrees on a complex plane.

Advantageous Effects of Invention

An optical transmitter according to the present invention provides an advantage in being capable of improving phase noise tolerance in an eight-dimensional modulation using a QPSK symbol constellation.

BRIEF DESCRIPTION OF DRAWINGS

FIG. 4 is a diagram illustrating a first conversion table used by a bit converter according to the first embodiment.

FIG. 5 is a diagram illustrating a second conversion table used by the bit converter according to the first embodiment.

DESCRIPTION OF EMBODIMENTS

An optical transmitter, an optical receiver, and an optical communication system according to embodiments of the present invention will be described in detail below with reference to the drawings. Note that these embodiments are not intended to limit the scope of this invention.

First Embodiment

Figure 1:
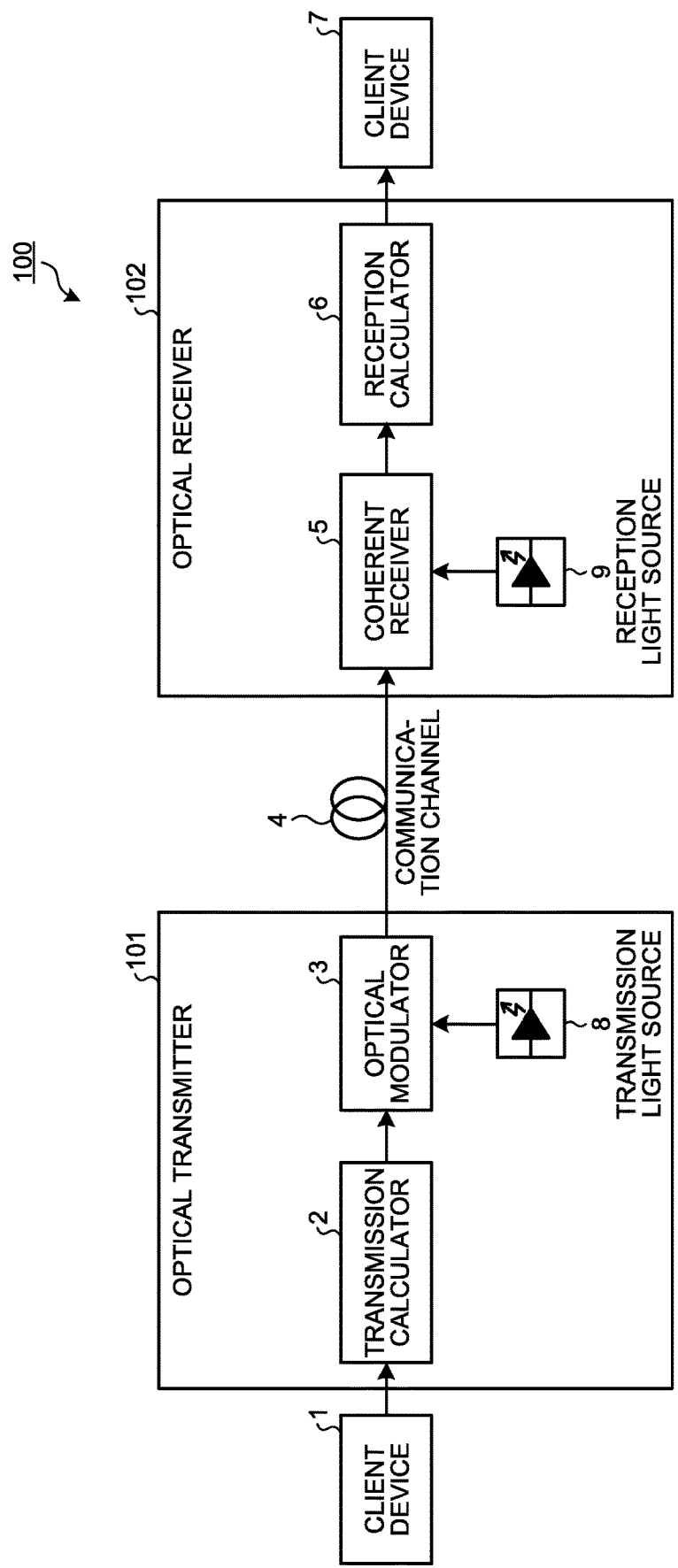
FIG. 1 is a diagram illustrating an example of an optical communication system according to a first embodiment.

FIG. 1 is a diagram illustrating an example of an optical communication system configured to include an optical transmitter and an optical receiver according to a first embodiment of the present invention An optical communication system 100 includes: a client device 1, which sends a client signal; an optical transmitter 101, which converts the client signal that is an electrical signal into an optical signal, and sends the optical signal to a communication channel 4; an optical receiver 102, which receives the optical signal from the communication channel 4, and converts the optical signal into a client signal; and a client device 7, which receives the client signal. The optical transmitter 101 and the optical receiver 102 each function as an optical communication device. That is, the optical transmitter 101 functions as an optical communication device on the transmission side, and the optical receiver 102 functions as an optical communication device on the reception side.

The optical transmitter 101 includes a transmission calculator 2, an optical modulator 3, and a transmission light source 8. The optical receiver 102 includes a coherent receiver 5, a reception calculator 6, and a reception light source 9.

Although FIG. 1 illustrates the optical communication system 100 configured such that the client device 1 sends a client signal toward the client device 7, the client signal may also be sent in the opposite direction. That is, the client devices 1 and 7 may perform bidirectional communication. In a case in which the client devices 1 and 7 are to perform bidirectional communication, the optical communication device connected to the client device 1 includes the optical transmitter 101 and the optical receiver 102, and similarly, the optical communication device connected to the client device 7 includes the optical transmitter 101 and the optical receiver 102.

An operational outline of the optical transmitter 101 will now be described. The transmission calculator 2 performs processing such as framing, encoding, and digital to analog conversion on the client signal sent from the client device 1, and outputs the resultant signal to the optical modulator 3. The optical modulator 3 modulates continuous light having an arbitrary light carrier wave frequency output from the transmission light source 8, using the electrical signal input from the transmission calculator 2. The electrical signal input from the transmission calculator 2 to the optical modulator 3 may be amplified using an amplifier.

The optical signal output from the optical modulator 3 of the optical transmitter 101 is transmitted through the communication channel 4. The communication channel 4 generally includes an optical fiber, an optical amplifier for propagation loss compensation, and the like.

An operational outline of the optical receiver 102 will now be described. The coherent receiver 5: receives, as inputs, the optical signal transmitted through the communication channel 4 and continuous light output from the reception light source 9 used as a local oscillator; and extracts the signal component excluding the light carrier wave component by performing homodyne detection. In this operation, the local oscillator light emitted from the reception light source 9 to perform homodyne detection needs to have a same frequency as the frequency of the continuous light generated by the transmission light source 8 of the optical transmitter 101. The electrical signal that is the signal component extracted by the coherent receiver 5 is output to the reception calculator 6. The reception calculator 6 performs analog to digital conversion on the electrical signal received from the coherent receiver 5, further performs processing such as compensation for signal degradation resulting from transmission and error correction processing, converts the resultant signal into a client signal, and outputs the client signal to the client device 7.

The transmission calculator 2 included in the optical transmitter 101 and the reception calculator 6 included in the optical receiver 102 will next be described in detail.

Description of Transmission Calculator 2

Figure 2:
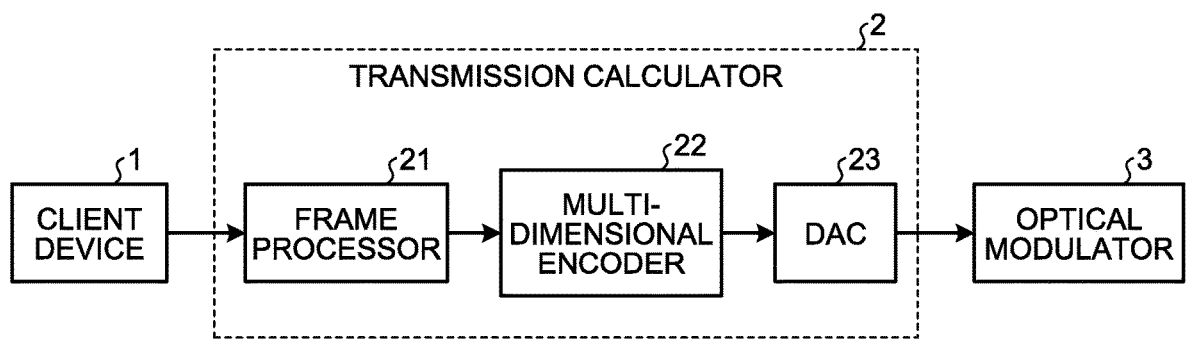
FIG. 2 is a diagram illustrating an example configuration of a transmission calculator according to the first embodiment.

FIG. 2 is a diagram illustrating an example configuration of the transmission calculator 2 according to the first embodiment. Note that the client device 1 upstream of the transmission calculator, and the optical modulator 3 downstream of the transmission calculator 2 are also illustrated. The transmission calculator 2 includes a frame processor 21, a multi-dimensional encoder 22, and a digital to analog conversion unit (digital to analog converter (DAC)) 23.

The frame processor 21 receives a client signal output from the client device 1, and adds one or more bits required for transmission to the client signal to generate a frame. In addition to the information bit of the client signal, the frame generated by the frame processor 21 also includes, for example, a redundant bit for forward error correction (FEC), an optical network control bit, and/or the like. The frame has a structure provided in, for example, the document "Recommendation ITU-T G.709/Y.1331, ITU-T, 2016".

The multi-dimensional encoder 22 maps the input signal, eight-dimensionally, to symbol points on a complex plane using two consecutive time slots. The two time slots used for mapping are herein denoted by TS1 and TS2. After being mapped onto the complex plane, the digital signal is input to the DA converter 23, and is converted into an analog signal, which is then input to the optical modulator 3. The transmission calculator 2 has an output interface having four channels, respectively corresponding to voltage levels of axes (XI, XQ, YI, and YQ) in a complex plane of each polarization.

Figure 3:
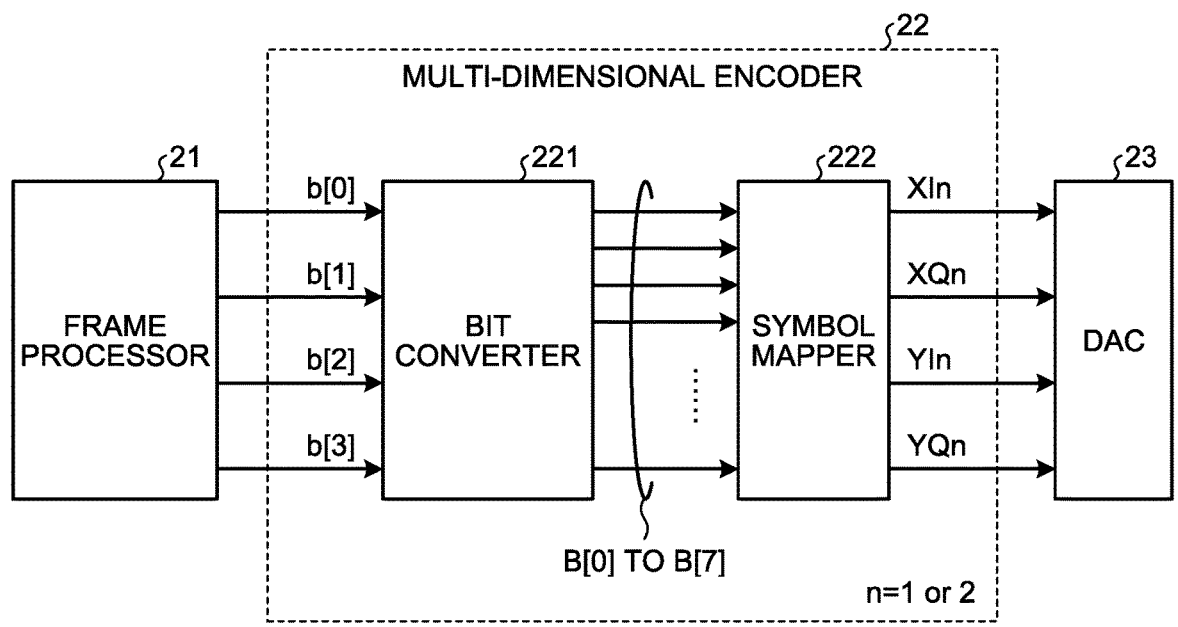
FIG. 3 is a diagram illustrating an example configuration of a multi-dimensional encoder included in the transmission calculator according to the first embodiment.

FIG. 3 is a diagram illustrating an example configuration of the multi-dimensional encoder 22 included in the transmission calculator 2 according to the first embodiment. Note that the frame processor 21 upstream of the multi-dimensional encoder, and the DA converter 23 downstream of the multi-dimensional encoder 22 are also illustrated. The multi-dimensional encoder 22 includes a bit converter 221 and a symbol mapper 222, and makes a sequence of four bits as one set, and performs multi-dimensional encoding for every set.

The bit converter 221 divides a bit sequence input from the frame processor 21 into four-bit sequences, and inserts parity bits to generate an output bit sequence having eight bits. The four bits of the input bit sequence from the frame processor 21, processed by the bit converter 221, are hereinafter denoted by b[0], b[1], b[2], and b[3] in order from the most significant bit.

Figures 6, 7:
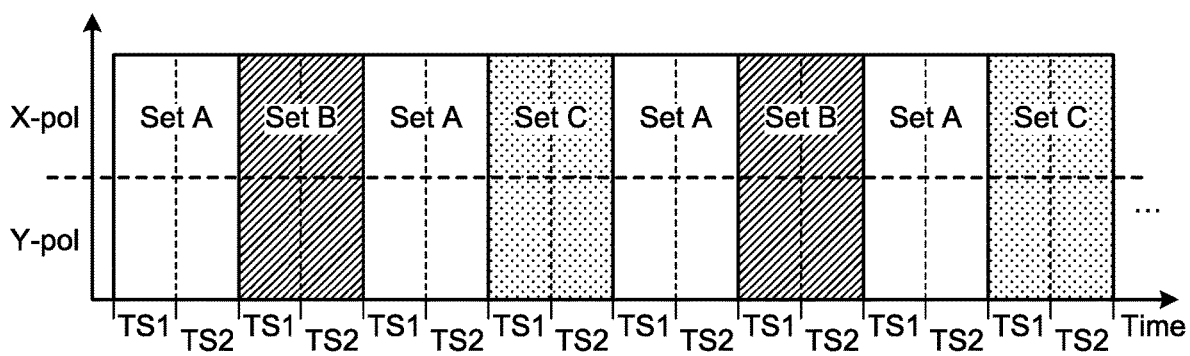
FIG. 6 is a diagram illustrating a third conversion table used by the bit converter according to the first embodiment.
FIG. 7 is a diagram illustrating symbol sets applied to time slots by the bit converter according to the first embodiment.

The bit converter 221 inserts a total of four bits of parity bits into the four-bit sequence that has been input, thus to convert the four-bit sequence into an eight-bit sequence corresponding to one of three symbol sets illustrated in FIGS. 4 to 6, and outputs the eight-bit sequence. The three symbol sets illustrated in FIGS. 4 to 6 are hereinafter referred to as symbol sets A, B, and C, respectively. The bit converter 221 uses one of the symbol sets of eight-bit sequences in conversion processing that will be described later herein. The bit converter 221 may convert the four-bit sequence that has been input, into an eight-bit sequence, by hardware or by software processing using a conversion table.

A detailed operation of the bit converter 221 will now be described. The eight bits output by the bit converter 221 are hereinafter denoted by B[0], B[1], B[2], B[3], B[4], B[5], B[6], and B[7] in order from the most significant bit. FIG. 4 is a diagram illustrating a first conversion table used by the bit converter 221. FIG. 4 illustrates the conversion table corresponding to symbol set A (Set A). FIG. 5 is a diagram illustrating a second conversion table used by the bit converter 221. FIG. 5 illustrates the conversion table corresponding to symbol set B (Set B). FIG. 6 is a diagram illustrating a third conversion table used by the bit converter 221. FIG. 6 illustrates the conversion table corresponding to symbol set C (Set C).

In each of the conversion tables illustrated in FIGS. 4 to 6, the bits indicated by "D" in the column header of bit sequences are data bits, and the bits indicated by "P" are parity bits to provide redundancy.

In performing of the processing based on the conversion table of symbol set A illustrated in FIG. 4, the bit converter 221 outputs the input bits b[0], b[1], b[2], and b[3] respectively as the bits B[0], B[1], B[2], and B[3], and outputs the four bits of parity bits as the bits B[4], B[5], B[6], and B[7]. For example, when the input bit sequence is "0000", the bit converter 221 adds parity bits "0110", and thus outputs "00000110". Otherwise, when the input bit sequence is "0011", the bit converter 221 adds parity bits "1011", and thus outputs "00111011".

In performing of the processing based on the conversion table of symbol set B illustrated in FIG. 5, the bit converter 221 outputs the input bits b[0], b[1], b[2], and b[3] respectively as the bits B[0], B[2], B[5], and B[7], and outputs the four bits of parity bits as B[1], B[3], B[4], and B[6]. For example, when the input bit sequence is "0000", the bit converter 221 inserts parity bits "0101" sequentially in the parity bit positions of symbol set B, and thus outputs "00010010". Otherwise, when the input bit sequence is "0011", the bit converter 221 inserts parity bits "0110" sequentially in the parity bit positions of symbol set B, and thus outputs "00011101". As illustrated in FIG. 5, in performing of the processing based on the conversion table of symbol set B, the bit converter 221 outputs "00" or "11" as the bits "B[0] and B[1]", and outputs "10" or "01" as the bits "B[6] and B[7]".

In performing of the processing based on the conversion table of symbol set C illustrated in FIG. 6, the bit converter 221 outputs, similarly to the conversion processing based on the conversion table of symbol set B described above, the input bits b[0], b[1], b[2], and b[3] respectively as the bits B[0], B[2], B[5], and B[7], and the four bits of parity bits as B[1], B[3], B[4], and B[6]. For example, when the input bit sequence is "0000", the bit converter 221 inserts parity bits "1010" sequentially in the parity bit positions of symbol set C, and thus outputs "01001000". Otherwise, when the input bit sequence is "0011", the bit converter 221 inserts parity bits "1001" sequentially in the parity bit positions of symbol set C, and thus outputs "01000111". As illustrated in FIG. 6, in performing of the processing based on the conversion table of symbol set C, the bit converter 221 outputs "01" or "10" as the bits "B[0] and B[1]", and outputs "00" or "11" as the bits "B[6] and B[7]".

FIG. 7 is a diagram illustrating symbol sets applied to the time slots by the bit converter 221. As illustrated in FIG. 7, the bit converter 221 converts each sequence of four bits input, into an eight-bit sequence by sequentially switching the conversion tables as Set A→Set B→Set A→Set C→Set A→ . . . . That is, the bit converter 221 performs the conversion processing into an eight-bit sequence corresponding to Set A once every two times, and the conversion processing into an eight-bit sequence corresponding to Set B and the conversion processing into an eight-bit sequence corresponding to Set C once every four times each. Note that the conversion processing corresponding to Set B and the conversion processing corresponding to Set C may be performed in the opposite order. In addition, the conversion processing may be performed in order of, for example, Set A→Set A→Set B→Set A→Set A→Set C→Set A→ . . . . That is, the processing may be repeated in such a manner that the conversion processing corresponding to Set A is performed two times consecutively, after which the conversion processing corresponding to Set B or the conversion processing corresponding to Set C is performed. In other words, the bit converter 221 may perform the conversion processing corresponding to Set A at a first ratio, and the conversion processing corresponding to Set B and the conversion processing corresponding to Set C at a second ratio lower than the first ratio.

The symbol mapper 222 divides the eight bits output from the bit converter 221 into a group of the four most significant bits and a group of the four least significant bits, and allocates these groups respectively to TS1 and TS2, which are two consecutive time slots. The symbol mapper 222 allocates the four most significant bits to TS1, and allocates the four least significant bits to TS2. In addition, the symbol mapper 222 divides each group of the four bits into the two most significant bits and the two least significant bits, and maps the two most significant bits and the two least significant bits respectively to I-axis and Q-axis values of the X-polarization and to I-axis and Q-axis values of the Y-polarization in each of TS1 and TS2. The symbol mapper 222 outputs 4 channels of digital signal XI, XQ, YI, and YQ as the output of the multi-dimensional encoder 22. As used herein, XI1 represents an I-axis value of the X-polarization in TS1; XQ1 represents a Q-axis value of the X-polarization in TS1; YI1 represents an I-axis value of the Y-polarization in TS1; and YQ1 represents a Q-axis value of the Y-polarization in TS1. XI2 represents an I-axis value of the X-polarization in TS2; XQ2 represents a Q-axis value of the X-polarization in TS2; YI2 represents an I-axis value of the Y-polarization in TS2; and YQ2 represents a Q-axis value of the Y-polarization in TS2.

Figure 8:
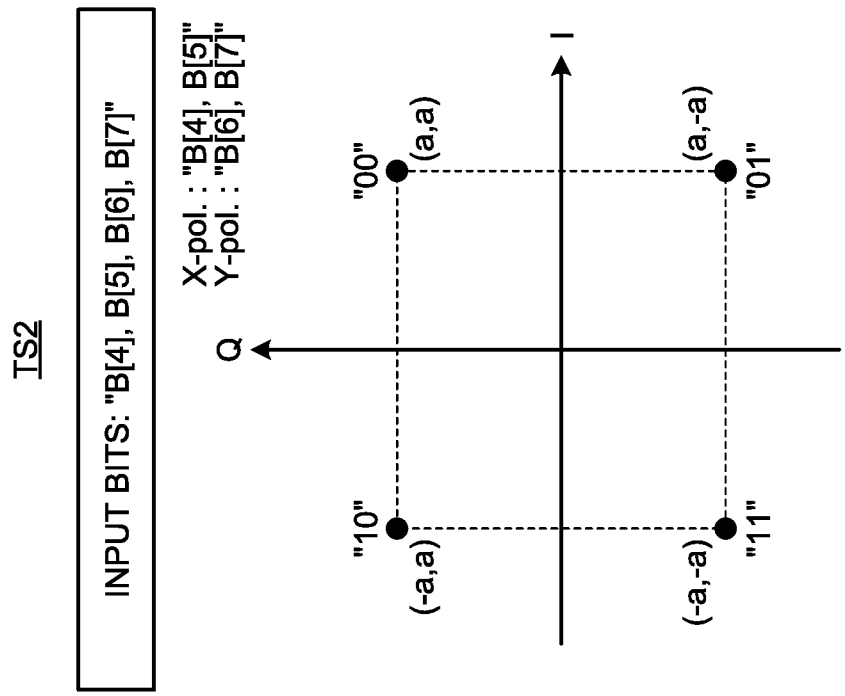
FIG. 8 is a diagram illustrating symbol constellations of two consecutive time slots TS1 and TS2.
Figure 8:
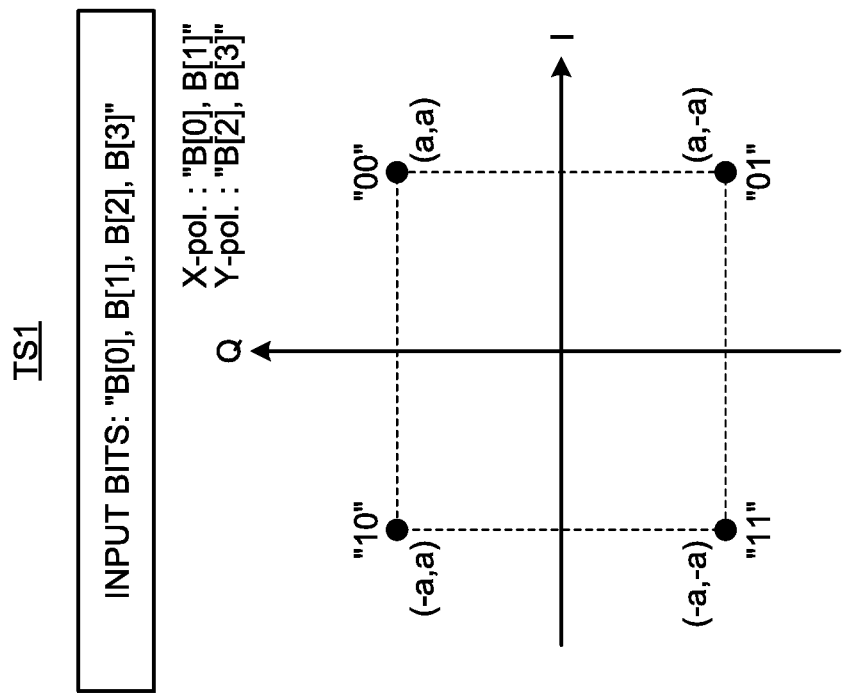

FIG. 8 is a diagram illustrating symbol constellations of two consecutive time slots TS1 and TS2. The symbol constellations illustrated in FIG. 8 are each a DP-QPSK symbol constellation.

As illustrated in FIG. 8, the symbol mapper 222 maps the bits B[0], B[1], B[2], and B[3] of the eight input bits B[0], B[1], B[2], B[3], B[4], B[5], B[6], and B[7] respectively to XI1, XQ1, YI1, and YQ1. Similarly, the symbol mapper 222 maps the bits B[4], B[5], B[6], and B[7] respectively to XI2, XQ2, YI2, and YQ2. That is, the symbol mapper 222 allocates the bits in TS1 such that the two most significant bits (B[0] and B[1]) are mapped onto the X-polarization, and the two least significant bits (B[2] and B[3]) are mapped onto the Y-polarization. The symbol mapper 222 also allocates the bits in TS2 such that the two most significant bits (B[4] and B[5]) are mapped onto the X-polarization, and the two least significant bits (B[6] and B[7]) are mapped onto the Y-polarization. In this operation, the symbol mapper 222 allocates these bits such that the most significant bit (MSB) corresponds to an I-axis value, and the least significant bit (LSB) corresponds to a Q-axis value, on each complex plane. In addition, the symbol mapper 222 allocates the bits to symbol points such that only one bit of the corresponding input bits is inverted in each pair of symbol points next to each other. Although FIG. 8 illustrates the complex coordinate values of a symbol point each using a relative value "a" (>0), the complex coordinate values may be illustrated using any specific value.

As described above, in performing of the processing based on the conversion table of symbol set B, the bit converter 221 outputs "00" or "11" as the bits "B[0] and B[1]", and outputs "10" or "01" as the bits "B[6] and B[7]". Accordingly, the symbol mapper 222 allocates "00" or "11" to the X-polarization in TS1 upon application of symbol set B, and allocates "10" or "01" to the Y-polarization in TS2 upon application of symbol set B. Otherwise, in performing of the processing based on the conversion table of symbol set C, the bit converter 221 outputs "01" or "10" as the bits "B[0] and B[1]", and outputs "00" or "11" as the bits "B[6] and B[7]". Accordingly, the symbol mapper 222 allocates "01" or "10" to the X-polarization in TS1 upon application of symbol set C, and allocates "00" or "11" to the Y-polarization in TS2 upon application of symbol set C.

Thus, X-polarization in TS1 upon application of symbol set B will have symbols allocated in the first quadrant and in the third quadrant of the complex plane, and will have no symbols allocated in the second quadrant and in the fourth quadrant. In addition, the Y-polarization in TS2 upon application of symbol set B will have symbols allocated in the second quadrant and in the fourth quadrant of the complex plane, and will have no symbols allocated in the first quadrant and in the third quadrant. Similarly, the X-polarization in TS1 upon application of symbol set C will have symbols allocated in the second quadrant and in the fourth quadrant of the complex plane, and will have no symbols allocated in the first quadrant and in the third quadrant. In addition, the Y-polarization in TS2 upon application of symbol set C will have symbols allocated in the first quadrant and in the third quadrant of the complex plane, and will have no symbols allocated in the second quadrant and in the fourth quadrant. As described above, the X-polarization in TS1 upon application of symbol set B, the Y-polarization in TS2 upon application of symbol set B, the X-polarization in TS1 upon application of symbol set C, and the Y-polarization in TS2 upon application of symbol set C will each have the symbols allocated to two constellation points having phases different by 180 degrees, among four constellation points. This can improve phase noise tolerance as compared to when the symbols are allocated to four constellation points.

Description of Reception Calculator 6

Figure 9:
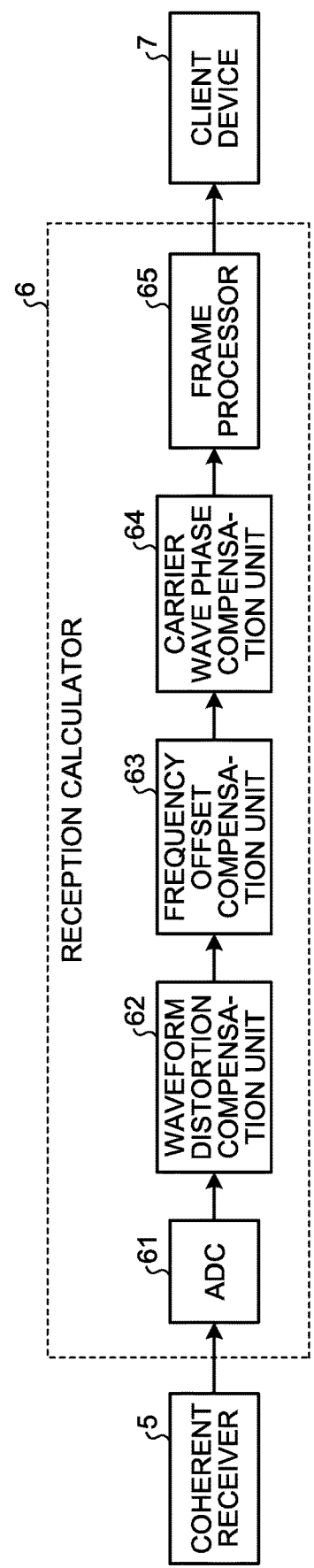
FIG. 9 is a diagram illustrating an example configuration of a reception calculator according to the first embodiment.

FIG. 9 is a diagram illustrating an example configuration of the reception calculator 6. Note that the coherent receiver 5 upstream of the reception calculator 6, and the client device 7 downstream of the reception calculator 6 are also illustrated. The reception calculator 6 includes an analog to digital converter (analog to digital converter (ADC)) 61, a waveform distortion compensation unit 62, a frequency offset compensation unit 63, a carrier wave phase compensation unit 64, and a frame processor 65.

The AD converter 61 receives an analog electrical signal output from the coherent receiver 5, converts the analog electrical signal into a digital electrical signal, and outputs the digital electrical signal to the waveform distortion compensation unit 62. The waveform distortion compensation unit 62 performs, on the signal input from the AD converter 61, a process of compensation for waveform distortion accumulated during transmission such as those caused by non-linear optical effect and wavelength dispersion. In addition, the waveform distortion compensation unit 62 separates the signal that has been compensated into two polarized waves orthogonal to each other. The frequency offset compensation unit 63 performs, on the signal output from the waveform distortion compensation unit 62, a process of compensation for a frequency offset between the light carrier wave and the local oscillator light output from the reception light source 9. The carrier wave phase compensation unit 64 removes phase noise from the reception signal that has been compensated for the frequency offset in the frequency offset compensation unit 63, and extracts a reception symbol. The frame processor 65 reconstructs the reception symbol output from the carrier wave phase compensation unit 64 into a frame that can be processed by the client device 7, and outputs the resultant signal to the client device 7. If the optical transmitter 101 has performed a process of addition of a redundant bit for FEC, the frame processor 65 also performs FEC decoding.

Figure 10:
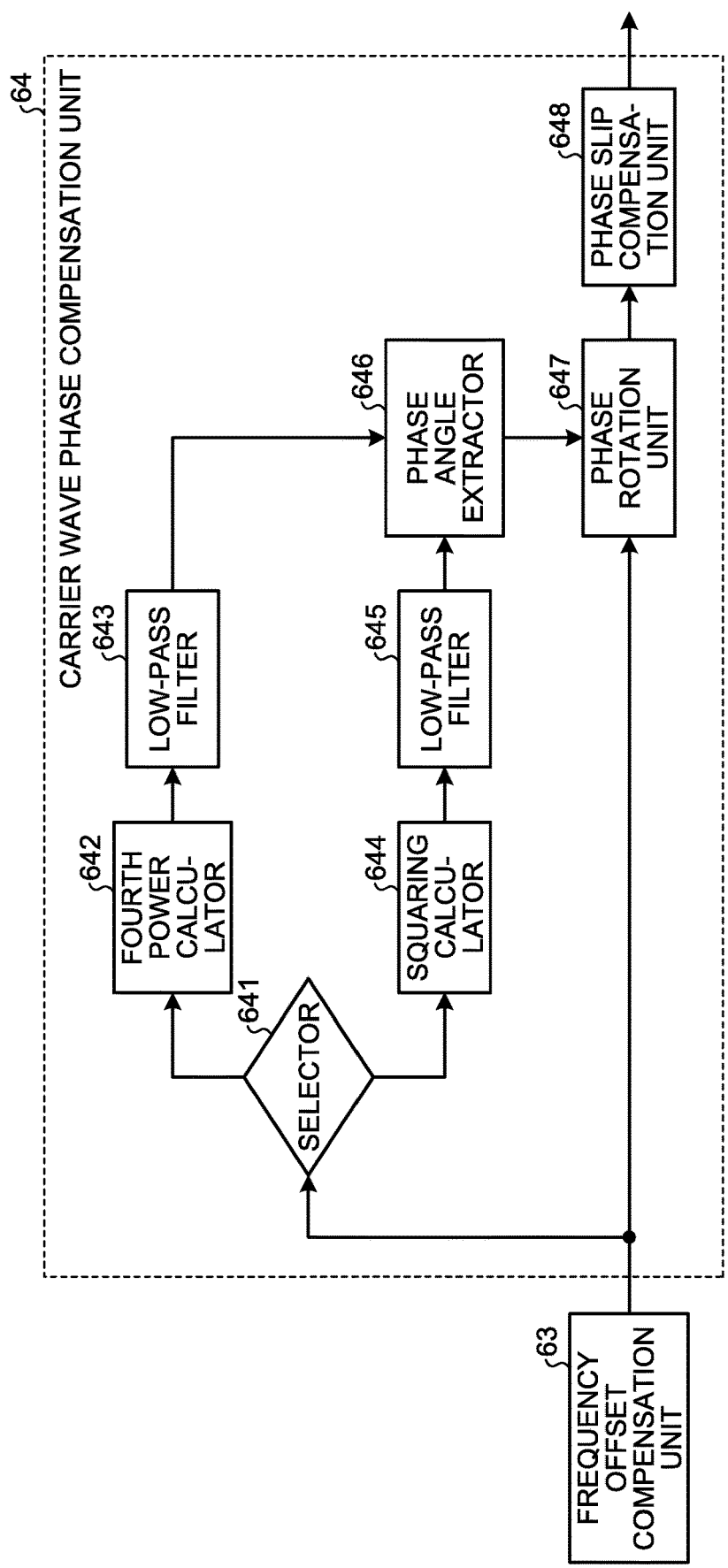
FIG. 10 is a diagram illustrating an example configuration of a carrier wave phase compensation unit included in the reception calculator according to the first embodiment.

FIG. 10 is a diagram illustrating an example configuration of the carrier wave phase compensation unit 64 included in the reception calculator 6 according to the first embodiment. Note that the frequency offset compensation unit 63 upstream of the carrier wave phase compensation unit 64 is also illustrated. The carrier wave phase compensation unit 64 includes a selector 641, a fourth power calculator 642, a low-pass filter 643, a squaring calculator 644, a low-pass filter 645, a phase angle extractor 646, a phase rotation unit 647, and a phase slip compensation unit 648. The carrier wave phase compensation unit 64 performs phase compensation by estimating a phase of the light carrier wave through blind estimation. The reception signal output from the frequency offset compensation unit 63 is input to the selector 641 and to the phase rotation unit 647.

The selector 641 outputs the input signal received from the frequency offset compensation unit 63 to the fourth power calculator 642 or to the squaring calculator 644. Specifically, upon application of symbol set A to the input signal, that is, in a case in which the input signal includes bits converted based on the conversion table illustrated in FIG. 4, the selector 641 outputs the input signal to the fourth power calculator 642, which is a first destination, while upon application of symbol set B or C to the input signal, the selector 641 outputs the input signal to the squaring calculator 644, which is a second destination. Note that the carrier wave phase compensation unit 64 has information on the order of application of symbol sets A, B, and C, and on the structure of each symbol set, and can thus detect timing of application of each symbol set based on these pieces of information.

The fourth power calculator 642: raises the input signal received from the selector 641 to the fourth power to remove the data component contained in the input signal; and outputs the signal after the data component removal to the low-pass filter 643, which is a first low-pass filter. The squaring calculator 644 squares the input signal from the selector 641 to remove the data component contained in the input signal, and outputs the signal after data component removal to the low-pass filter 645, which is a second low-pass filter. The low-pass filters 643 and 645 are each, for example, a digital filter such as a moving average filter or a Gaussian filter. The low-pass filters 643 and 645 each remove high frequency components from the input signal to improve the signal to noise ratio (SNR) of the signal, and then output the filtered signal to the phase angle extractor 646. The phase angle extractor 646 extracts phase information of the light carrier wave from the input signal, and outputs the phase information to the phase rotation unit 647. The phase angle extractor 646 operates as a first phase information extractor in a case in which the signal is input from the low-pass filter 643 being the first low-pass filter, and operates as a second phase information extractor in a case in which the signal is input from the low-pass filter 645 being the second low-pass filter. The fourth power calculator 642, the low-pass filter 643, and the phase angle extractor 646 together form a first phase estimator, and the squaring calculator 644, the low-pass filter 645, and the phase angle extractor 646 together form a second phase estimator.

The phase rotation unit 647 is a phase noise remover, and removes phase noise by rotating the phase of the reception signal input from the frequency offset compensation unit 63 based on the phase information received from the phase angle extractor 646. The phase rotation unit 647 outputs the signal after phase noise removal to the phase slip compensation unit 648. The phase slip compensation unit 648 performs, on the input signal, a process of compensation for the phase slip if an occurrence of a phase slip is found during computation processing by the fourth power calculator 642 or the squaring calculator 644. The phase slip compensation unit 648 determines whether a phase slip has occurred or not, using, for example, a known signal sequence contained in the input signal, and rotates the phase of the input signal to compensate for the phase slip if occurrence of a phase slip is detected.

As described above, in the optical communication system 100 according to the first embodiment, the transmission calculator 2 included in the optical transmitter 101 uses symbol set A, symbol set B, or symbol set C for multi-dimensional encoding of transmission data to convert four bits of data into an eight-bit sequence. In addition, in the conversion processing using symbol set B and in the conversion processing using symbol set C, the transmission calculator 2 performs processing such that a sequence of the two most significant bits and a sequence of the two least significant bits of the eight bits are respectively associated with values that are allocated respectively to two constellation points having phases different by 180 degrees on a complex plane. Further, the transmission calculator 2 performs the conversion processing using symbol set A once every two times, and performs the conversion processing using symbol set B and the conversion processing using symbol set C once every four times each.

Thus, three quarters (¾) of the bits are transmitted using a QPSK symbol having high noise tolerance and high insusceptibility to non-linear optical effect, and the remaining one quarter (¼) of the bits is transmitted using a BPSK symbol having high phase slip resistance. This enables a phase slip to be compensated, on the reception side, using a BPSK symbol having high phase slip resistance even in a situation where a phase slip frequently occurs, and thus improved phase noise tolerance to be provided in eight-dimensional modulation that uses a QPSK symbol constellation. Moreover, the X-polarization has the BPSK symbol generated by using symbol set B plotted in the first quadrant and in the third quadrant of the complex plane, and has the BPSK symbol generated by using symbol set C plotted in the second quadrant and in the fourth quadrant of the complex plane. The Y-polarization has the BPSK symbol generated by using symbol set B plotted in the second quadrant and in the fourth quadrant of the complex plane, and has the BPSK symbol generated by using symbol set C plotted in the first quadrant and in the third quadrant of the complex plane. This prevents uneven arrangement of the symbol points, thereby reducing factors of degradation in signal quality such as a pattern effect occurring in an optical modulator.

Figure 11:
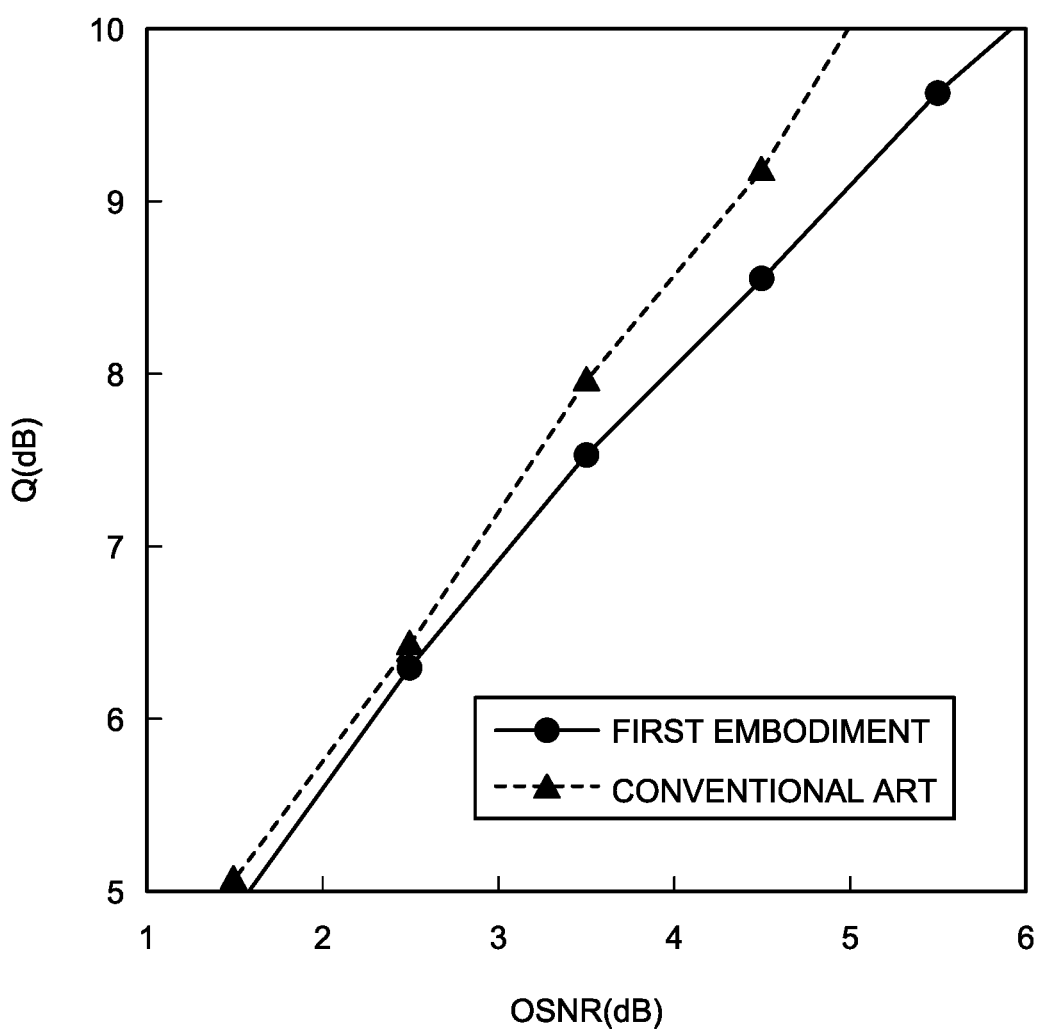
FIG. 11 is a diagram illustrating signal quality in a case of applying of the optical transmitter according to the first embodiment.

FIG. 11 is a diagram illustrating signal quality in a case of applying of the optical transmitter 101 according to the first embodiment. In FIG. 11, the vertical axis represents a Q-value, and the horizontal axis represents an optical signal to noise ratio (OSNR). A Q-value is an index representing a signal quality, and is a value determined uniquely for a bit error ratio (BER) when the distribution of a noise amplitude is a Gaussian distribution (G distribution). For the purpose of comparison, FIG. 11 also illustrates a simulation result when the optical transmitter 101 according to the first embodiment is not applied. No use of the optical transmitter 101 according to the first embodiment corresponds to no performance of bitwise conversion using symbol sets A to C described above. The solid line with filled circles represents a simulation result when the optical transmitter 101 according to the first embodiment is applied, and the broken line with black triangles represents a simulation result when the optical transmitter 101 according to the first embodiment is not applied.

As illustrated in FIG. 11, application of the optical transmitter 101 according to the first embodiment can improve signal quality.

Second Embodiment

In the first embodiment described above, the carrier wave phase compensation unit 64 of the optical receiver 102 performs phase compensation for a carrier wave through blind estimation. An embodiment will next be described that performs phase compensation for a carrier wave using a pilot symbol that is a known signal sequence. Note that the optical communication system according to a second embodiment is configured similarly to the optical communication system according to the first embodiment. In addition, the optical transmitter included in the optical communication system according to the second embodiment is configured similarly to the optical transmitter of the first embodiment.

The optical receiver according to the second embodiment differs from the optical receiver according to the first embodiment only in the configuration of the carrier wave phase compensation unit included in the reception calculator. Thus, the description below will address only the carrier wave phase compensation unit, and a description of the other components will be omitted.

Figure 12:
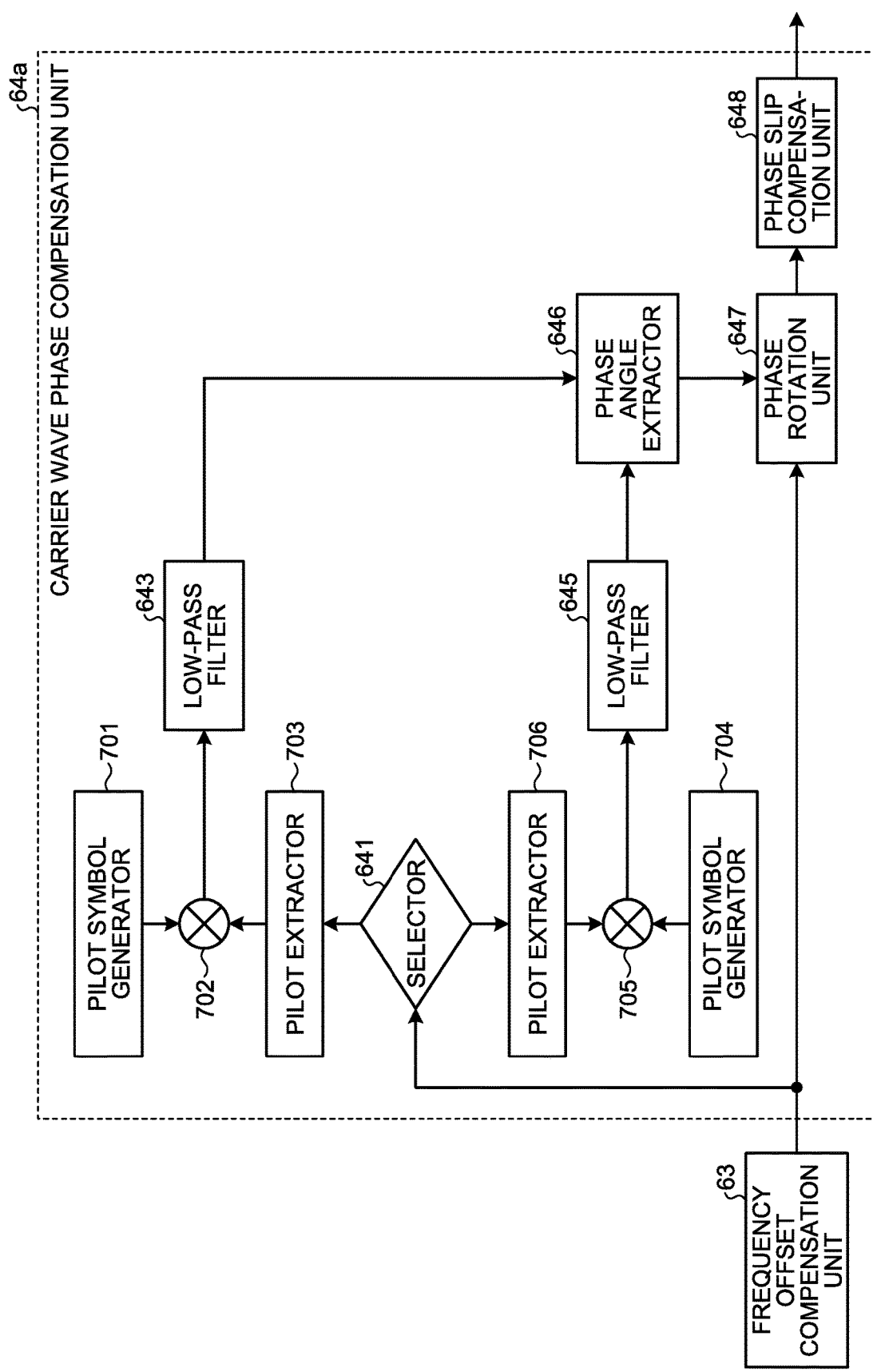
FIG. 12 is a diagram illustrating an example configuration of a carrier wave phase compensation unit included in a reception calculator of an optical receiver according to a second embodiment.

FIG. 12 is a diagram illustrating an example configuration of the carrier wave phase compensation unit included in the reception calculator of the optical receiver according to the second embodiment. A carrier wave phase compensation unit 64a according to the second embodiment is configured such that the fourth power calculator 642 of the carrier wave phase compensation unit 64 according to the first embodiment is replaced with a pilot symbol generator 701, a complex multiplier 702, and a pilot extractor 703, and that the squaring calculator 644 is replaced with a pilot symbol generator 704, a complex multiplier 705, and a pilot extractor 706. Differences from the carrier wave phase compensation unit 64 according to the first embodiment will be described below.

The output signal received from the selector 641 is input to the pilot extractor 703 or the pilot extractor 706. In this operation, the selector 641: outputs the signal to the pilot extractor 703, which is a first pilot extractor, upon application of symbol set A to the input signal; and outputs the signal to the pilot extractor 706, which is a second pilot extractor, upon application of symbol set B or C to the input signal.

The pilot extractor 703 extracts a pilot symbol contained in the signal input from the selector 641, and outputs the pilot symbol to the complex multiplier 702, which is a first complex multiplier. The pilot extractor 706 extracts a pilot symbol contained in the signal input from the selector 641, and outputs the pilot symbol to the complex multiplier 705, which is a second complex multiplier.

The pilot symbol generator 701, which is a first pilot symbol generator, generates the pilot symbol, and outputs the pilot symbol to the complex multiplier 702. The pilot symbol generator 704, which is a second pilot symbol generator, generates the pilot symbol, and outputs the pilot symbol to the complex multiplier 705.

The complex multiplier 702 multiplies the pilot symbol input from the pilot extractor 703 by the complex conjugate of the pilot symbol input from the pilot symbol generator 701, and outputs the resultant calculation result to the low-pass filter 643. The calculation result output by the complex multiplier 702 is a signal without the data component, i.e., the pilot symbol, of the signal input from the pilot extractor 703. The complex multiplier 705 multiplies the pilot symbol input from the pilot extractor 706 by the complex conjugate of the pilot symbol input from the pilot symbol generator 704, and outputs the resultant calculation result to the low-pass filter 645. The calculation result output by the complex multiplier 705 is a signal without the data component, i.e., the pilot symbol, of the signal input from the pilot extractor 706.

Note that, in the carrier wave phase compensation unit 64a, the pilot symbol generator 701, the complex multiplier 702, the pilot extractor 703, the low-pass filter 643, and the phase angle extractor 646 together form a first phase estimator; and the pilot symbol generator 704, the complex multiplier 705, the pilot extractor 706, the low-pass filter 645, and the phase angle extractor 646 together form a second phase estimator.

As described above, the carrier wave phase compensation unit 64a of the optical receiver according to the second embodiment uses a known signal sequence to estimate the phase of the light carrier wave, and can thus estimate the phase with high accuracy even in a low SNR region.

Figure 13:
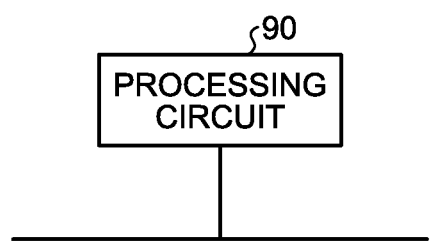
FIG. 13 is a diagram illustrating a processing circuit for implementing the optical transmitter.

Note that the bit converter 221 and the symbol mapper 222 of the multi-dimensional encoder 22 included in the transmission calculator 2 in the optical transmitter 101 described in the first embodiment are implemented in a processing circuit 90 illustrated in FIG. 13. That is, the optical transmitter 101 includes a processing circuit 90 for adding parity bits to four bits of input data to convert the input data into eight bits of transmission data, and for converting the transmission data into constellation point coordinates. The processing circuit 90 may be a dedicated hardware element, or may be a central processing unit (CPU) (also referred to as central processing unit, processing unit, computing unit, microprocessor, microcomputer, processor, digital signal processor (DSP)) that executes a program stored in a memory.

In a case in which the processing circuit 90 is a dedicated hardware element, the processing circuit 90 is, for example, a single circuit, a set of multiple circuits, a programmed processor, a set of multiple programmed processors, an application specific integrated circuit (ASIC), a field programmable gate array (FPGA), or a combination thereof. The bit converter 221 and the symbol mapper 222 may each be implemented in an individual one of the processing circuits 90, or the bit converter 221 and the symbol mapper 222 may be integrally implemented in a single processing circuit 90.

Figure 14:
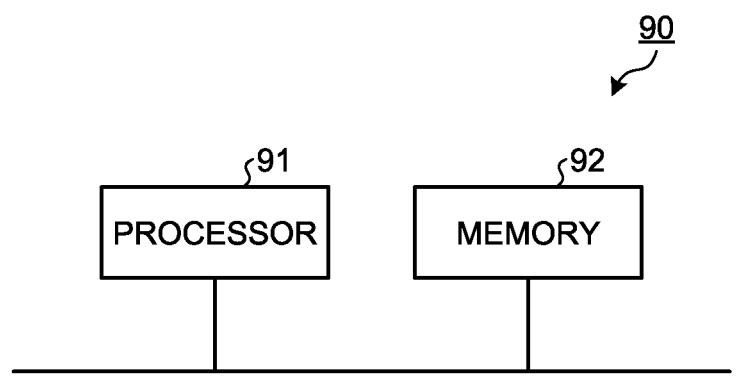
FIG. 14 is a diagram illustrating a configuration of a processing circuit for implementing the optical transmitter.

In a case in which the processing circuit 90 is a CPU that executes a program stored in a memory, the bit converter 221 and the symbol mapper 222 of the multi-dimensional encoder 22 are implemented in software, firmware, or a combination of software and firmware. In this case, the processing circuit 90 includes a processor 91 and a memory 92 illustrated in FIG. 14. The software or firmware to implement the bit converter 221 and the symbol mapper 222 is described as a program, and is stored in the memory 92. The processor 91 reads and executes a program stored in the memory 92 to implement the functionality of the bit converter 221 and of the symbol mapper 222. That is, the processing circuit 90 includes the memory 92 for storing programs that cause, upon execution of the bit converter 221 and the symbol mapper 222 by the processor 91, steps to be performed, where the steps include a step of adding a parity bit to a bit or bits of data for modulation, and a step of converting the data for modulation into a constellation point coordinates. It can also be said that these programs cause a computer to perform procedures or methods of the bit converter 221 and of the symbol mapper 222. In this regard, the memory 92 is, for example, a non-volatile or volatile semiconductor memory such as a random access memory (RAM), a read-only memory (ROM), a flash memory, an erasable programmable ROM (EPROM), an electrically erasable programmable ROM (EEPROM); a magnetic disk, a flexible disk, an optical disk, a compact disc, a MiniDisc, a digital versatile disc (DVD), or the like.

Note that the bit converter 221 and the symbol mapper 222 may be partially implemented in a dedicated hardware element, and partially implemented in software or firmware.

For example, the transmission calculator 2 may be configured such that the functionality of the bit converter 221 is implemented in the processing circuit 90 serving as the dedicated hardware element, and the functionality of the symbol mapper 222 is implemented by the processor 91 by reading and executing a program stored in the memory 92.

Thus, the processing circuit 90 can implement the functionality of the bit converter 221 and of the symbol mapper 222 in a dedicated hardware element, software, firmware, or a combination thereof.

Although the foregoing description has been directed to the hardware for implementing the bit converter 221 and the symbol mapper 222 of the multi-dimensional encoder 22, the frame processor 21 included together with the multi-dimensional encoder 22 in the transmission calculator 2 of the optical transmitter 101 can similarly be implemented in a dedicated hardware element, software, firmware, or a combination thereof.

The waveform distortion compensation unit 62, the frequency offset compensation unit 63, the carrier wave phase compensation unit 64, and the frame processor 65 included in the reception calculator 6 of the optical receiver 102 as described in the first and second embodiments can also similarly be implemented in a dedicated hardware element, software, firmware, or a combination thereof.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

1, 7 client device; 2 transmission calculator; 3 optical modulator; 4 communication channel; 5 coherent receiver; 6 reception calculator; 8 transmission light source; 9 reception light source; 21, 65 frame processor; multi-dimensional encoder; 23 DA converter (DAC); 61 AD converter (ADC); 62 waveform distortion compensation unit; 63 frequency offset compensation unit; 64, 64a carrier wave phase compensation unit; 100 optical communication system; 101 optical transmitter; 102 optical receiver; 221 bit converter; 222 symbol mapper; 641 selector; 642 fourth power calculator; 643, 645 low-pass filter; 644 squaring calculator; 646 phase angle extractor; 647 phase rotation unit; 648 phase slip compensation unit; 701, 704 pilot symbol generator; 702, 705 complex multiplier; 703, 706 pilot extractor.

The invention claimed is:

1. An optical transmitter comprising:
a bit converter to process input bits in units of four bits, and to generate an output bit sequence having eight bits based on at least one of a first conversion table, a second conversion table, and a third conversion table; and
a symbol mapper to allocate the output bit sequence to an X-polarization and to a Y-polarization of each of two consecutive time slots,
wherein
the bit converter:
performs, at a first ratio, a process of generating the output bit sequence based on the first conversion table;
performs, each at a second ratio lower than the first ratio, a process of generating the output bit sequence based on the second conversion table and a process of generating the output bit sequence based on the third conversion table; and
performs the process of generating the output bit sequence based on the second conversion table and the process of generating the output bit sequence based on the third conversion table such that a sequence of two most significant bits and a sequence of two least significant bits of the output bit sequence are respectively associated with values that are allocated respectively to two constellation points having phases different by 180 degrees on a complex plane.

2. The optical transmitter according to claim 1, wherein, in the bit converter, the first ratio is once every two times, and the second ratio is once every four times.

3. The optical transmitter according to claim 1, wherein the bit converter performs the process of generating the output bit sequence based on the second conversion table and the process of generating the output bit sequence based on the third conversion table such that the sequence of two most significant bits and the sequence of two least significant bits of the output bit sequence are respectively associated with values that are allocated respectively to different quadrants of the complex plane.

4. The optical transmitter according to claim 1, wherein the bit converter:
performs the process of generating the output bit sequence based on the second conversion table such that the sequence of two most significant bits of the output bit sequence is associated with a value that is allocated to a first quadrant or to a third quadrant of the complex plane, and that the sequence of two least significant bits of the output bit sequence is associated with a value that is allocated to a second quadrant or to a fourth quadrant of the complex plane; and
performs the process of generating the output bit sequence based on the third conversion table such that the sequence of two most significant bits of the output bit sequence is associated with a value that is allocated to the second quadrant or to the fourth quadrant of the complex plane, and that the sequence of two least significant bits of the output bit sequence is associated with a value that is allocated to the first quadrant or to the third quadrant of the complex plane.

5. An optical receiver for receiving an optical signal from the optical transmitter according to claim 1, the optical receiver comprising:
a selector to output a signal to a first destination upon reception of an eight-bit sequence generated based on the first conversion table, and to output a signal to a second destination upon reception of an eight-bit sequence generated based on the second conversion table or on the third conversion table;
a first phase estimator to estimate a phase of a light carrier wave based on the signal output to the first destination;
a second phase estimator to estimate the phase of the light carrier wave based on the signal output to the second destination; and
a phase noise remover to remove phase noise from a reception signal based on an estimation result by the first phase estimator and an estimation result by the second phase estimator.

6. The optical receiver according to claim 5, wherein the first phase estimator and the second phase estimator each estimate the phase using a known signal sequence.

7. The optical receiver according to claim 6, wherein
the first phase estimator includes:
- a fourth power calculator to raise the signal output to the first destination to a fourth power to remove a data component;
- a first low-pass filter to remove a high frequency component from the signal whose data component has been removed in the fourth power calculator; and
- a first phase information extractor to extract information on the phase of the light carrier wave, from the signal whose high frequency component has been removed in the first low-pass filter, wherein the second phase estimator includes:
- a squaring calculator to square the signal output to the second destination to remove a data component;
- a second low-pass filter to remove a high frequency component from the signal whose data component has been removed in the squaring calculator; and
- a second phase information extractor to extract information on the phase of the light carrier wave, from the signal whose high frequency component has been removed in the second low-pass filter.

8. The optical receiver according to claim 5, wherein the first phase estimator and the second phase estimator each estimate the phase based on a pilot symbol contained in a reception signal.

9. The optical receiver according to claim 8, wherein
the first phase estimator includes:
- a first pilot symbol generator to generate a first pilot symbol;
- a first pilot extractor to extract the first pilot symbol from the signal output to the first destination;
- a first complex multiplier to multiply the first pilot symbol extracted by the first pilot extractor, by a complex conjugate of the first pilot symbol generated by the first pilot symbol generator;
- a first low-pass filter to remove a high frequency component from an output signal of the first complex multiplier; and
- a first phase information extractor to extract information on the phase of the light carrier wave from the signal whose high frequency component has been removed in the first low-pass filter, wherein the second phase estimator includes:
- a second pilot symbol generator to generate a second pilot symbol;
- a second pilot extractor to extract the second pilot symbol from the signal output to the second destination;
- a second complex multiplier to multiply the second pilot symbol extracted by the second pilot extractor, by a complex conjugate of the second pilot symbol generated by the second pilot symbol generator;
- a second low-pass filter to remove a high frequency component from an output signal of the second complex multiplier; and
- a second phase information extractor to extract information on the phase of the light carrier wave from the signal whose high frequency component has been removed in the second low-pass filter.

10. An optical communication system comprising: an optical transmitter including:
- a bit converter to process input bits in units of four bits, and to generate an output bit sequence having eight bits based on at least one of a first conversion table, a second conversion table, and a third conversion table; and
- a symbol mapper to allocate the output bit sequence to an X-polarization and to a Y-polarization of each of two consecutive time slots, wherein the bit converter:
- performs, at a first ratio, a process of generating the output bit sequence based on the first conversion table;
- performs, each at a second ratio lower than the first ratio, a process of generating the output bit sequence based on the second conversion table and a process of generating the output bit sequence based on the third conversion table; and
- performs the process of generating the output bit sequence based on the second conversion table and the process of generating the output bit sequence based on the third conversion table such that a sequence of two most significant bits and a sequence of two least significant bits of the output bit sequence are respectively associated with values that are allocated respectively to two constellation points having phases different by 180 degrees on a complex plane; and the optical receiver comprising:
- a selector to output a signal to a first destination upon reception of an eight-bit sequence generated based on the first conversion table, and to output to a second destination upon reception of an eight-bit sequence based on the second conversion table or on the third conversion table;
- a first phase estimator to estimate a phase of a light carrier wave based on the signal output to the first destination;
- a second phase estimator to estimate the phase of the light carrier wave based on the signal output to the second destination; and
- a phase noise remover to remove phase noise from a reception signal based on an estimation result by the first phase estimator and an estimation result by the second phase estimator.

* * * * *